United States Patent [19]

Kang et al.

[11] 4,396,994
[45] Aug. 2, 1983

[54] DATA SHIFTING AND ROTATING APPARATUS

[75] Inventors: Sung M. Kang, Bridgewater; Robert H. Krambeck, Warren, both of N.J.

[73] Assignee: Bell Telephone Laboratories, Incorporated, Murray Hill, N.J.

[21] Appl. No.: 221,777

[22] Filed: Dec. 31, 1980

[51] Int. Cl.³ .......................... G06F 7/00; G06F 19/00
[52] U.S. Cl. ........................................................ 364/900
[58] Field of Search ... 364/200 MS File, 900 MS File, 364/715, 757; 340/724, 726, 727, 146.3 H, 146.3 MA; 235/92 DP, 92 SH

[56] References Cited

U.S. PATENT DOCUMENTS

| | | | |
|---|---|---|---|
| 3,274,556 | 9/1966 | Paul et al. | 364/900 |
| 3,311,896 | 3/1967 | Delmege et al. | 364/900 |
| 3,510,846 | 5/1970 | Goldschmidt et al. | 364/900 |
| 3,596,251 | 7/1971 | Buchan et al. | 364/900 |
| 3,659,274 | 4/1972 | Kyser | 364/900 |
| 3,790,960 | 2/1974 | Amdahl et al. | 364/900 |
| 3,810,115 | 5/1974 | Stafford | 364/900 |
| 3,811,110 | 5/1974 | Inose et al. | 340/146.3 H |
| 3,818,203 | 6/1974 | Perlowski et al. | 364/900 |
| 3,914,744 | 10/1975 | Brown | 364/900 |
| 3,961,750 | 6/1976 | Dao | 364/900 |
| 4,051,358 | 9/1977 | Schwartz | 364/900 |
| 4,122,534 | 10/1978 | Cesaratto | 364/900 |
| 4,128,872 | 12/1978 | Prioste | 364/900 |
| 4,149,263 | 4/1979 | Prioste | 364/900 |

OTHER PUBLICATIONS

Gold et al., "Shift Register System for Image Orientation", *IBM Tech. Disclosure Bulletin*, vol. 18, No. 8, Jan. 1976, pp. 2633–2639.

*Primary Examiner*—Leo H. Boudreau
*Attorney, Agent, or Firm*—Arthur J. Torsiglieri

[57] ABSTRACT

A circuit for rotating a multibit binary word in either the right or the left direction includes a scale factor decoder receiving a scale factor word which specifies the magnitude of the rotation and a direction control signal which specifies the direction of rotation and providing a shift control word which is the same as the scale factor word when a right rotation is specified but providing a shift control word which is the complement of the scale factor word when a left rotation is specified. The circuit also includes a plurality of input buffers receiving an input word and providing corresponding input data, and a one-bit rotator receiving the input data and the direction control signal and rotating the input data in the right direction by one position when a left rotation is specified or providing the input data without rotation when a right rotation is specified. In addition, the circuit includes a network receiving data from the one-bit rotator and the shaft control word and rotating the data from the one-bit rotator in only the right direction by a magnitude specified by the shift control word. Furthermore, the circuit includes a plurality of output buffers receiving the data from the network and providing an output word.

10 Claims, 9 Drawing Figures

DATA SHIFTING AND ROTATING APPARATUS

BACKGROUND OF THE INVENTION

This invention relates to apparatus for shifting or rotating digital information and more particularly to a flow-through type shift/rotate circuit.

It is well known in the data processing art to provide data processing systems with means for shifting or rotating (circular shifting) multibit binary data. Shifting of data is typically required in performing certain arithmetic operations such as multiplication or division, while rotation of data is typically used in data field manipulation operations such as field extraction or insertion.

Prior art shift/rotate apparatus are generally of two types, namely the flow-through type which normally permits a shift operation or a rotate operation to be performed within a single time period of the processing unit and the shift register type in which the number of time periods of the processing unit required to complete a shift or a rotate operation depends on the number of positions shifted or rotated. In general, high operating speed is desirable in data processing systems. Therefore, the flow-through type shift/rotate apparatus which has a shorter execution time is preferred over the shift register type in high performance data processing systems.

It is believed that formerly, flow-through type shift/rotate apparatus have not been used in data processing systems fabricated on a single integrated circuit chip, i.e., microprocessor and microcomputers, primarily because the chip area limitations of the integrated circuit technologies used did not permit practical implementation of the highly complex prior art flow-through shift/rotate circuits. Thus, the chip area limitations dictated the use of the far simpler shift register type of shift/rotate circuit. Moreover, microprocessors and microcomputers have heretofore been designed primarily for relatively low performance applications. Therefore, the execution time of the shift register type of shift/rotate apparatus has been adequate for such applications.

Recent advances in integrated circuit technology in the area known as very large scale integration (VLSI) have made it possible to design microprocessors and microcomputer chips having a much greater number of components and capable of much higher performance. As such, the use of flow-through type shift/rotate circuit in such chips is now both desirable and practical. However, the chip area occupied by the shift/rotate circuit still has an important effect on the cost of the microprocessor or microcomputer in which it is used. In this respect, the prior art flow-through shift-rotate circuits are deficient in that they require a relatively large chip area for their implementation. Therefore, a need clearly exists for a flow-through type shift/rotate circuit which occupies a relatively small chip area when implemented in an integrated circuit.

Some prior art flow-through type shift/rotate circuits perform bidirectional (i.e., either right or left) shift or rotate operations using only a unidirectional shifter/rotator. A shift or a rotate operation in the opposite direction to that provided by the unidirectional shifter/rotator is performed by first reflecting (reversing the order of the bits) the data before passage through the shifter/rotator and reflecting the data again after passage through the shifter/rotator. Therefore, such prior art circuits require additional circuitry for performing the reflections on the data. One such prior art circuit uses a single data reflection circuit coupled to receive data from the unidirectional shifter/rotator and performs the shift or rotate operation in the opposite direction to that provided by the unidirectional shifter/rotator by making the data pass twice through both the shifter/rotator and the reflection circuit. From the standpoint of chip area, using a unidirectional shifter/rotator is advantageous because it occupies less chip area than a bidirectional shifter/rotator. However, in the case of the prior art circuits, the chip area savings derived from using a unidirectional shifter/rotator is more than cancelled by the addition of data reflection circuitry. Moreover, where the prior art circuit requires a double passage of the data, the execution time for a shift or rotate operation is also increased.

In another prior art flow-through type shift/rotate circuit, a bidirectional rotate circuit is combined with a vector mask generator and an appropriate gating network to provide a bidirectional shift/rotate circuit. For rotate operations, the mask generator is not used. However, for shift operations the output of the mask generator controls the gating network to provide masking of the circularly shifted bits of the data. This latter circuit configuration is advantageous in that it can be adapted to provide both the arithmetic shift operation as well as the logical shift operation. However, prior art bidirectional rotate circuits require a relatively large chip area for their implementation, although the mask generator may be implemented in a relatively small chip area. Therefore, a bidirectional rotate circuit occupying a small chip to be used in conjunction with a mask generator would be desirable. In particular it would be desirable to have a flow-through type circuit which provides bidirectional rotation of data using a unidirectional shifter/rotator but which requires neither reflection of the data nor multiple passes of the data through the circuit.

SUMMARY OF THE INVENTION

Accordingly, the present invention is a flow-through type rotate circuit suitable for microprocessor and microcomputer applications. The circuit performs the rotation operation on a multibit binary word in either a first or a second direction using a unidirectional shifter/rotator but without the head for performing any reflections on the binary word. To this end, the circuit includes control means adapted to receive a plurality of scale factor signals and a direction control signal indicating a rotating in the second direction. The control means responsive to the scale factor signals and the direction control signal provides a plurality of shift control signals which are respectively the complement of the scale factor signals and provides a plurality of shift control signals which are respectively the same as the scale factor signals when the directional control signal is absent. Also included are input means adapted to receive an N-bit input word and for providing N-bit input data, and one-bit rotate means adapted to receive the input data and the direction control signal and being responsive to the direction control signal for rotating the input data by one position in the first direction but providing the input data without rotation when the direction control signal is absent. In addition the circuit includes unidirectional shift/rotate means adapted to receive the data from the one-bit rotate means and the plurality of shift control signals and being responsive to the shift control signals for rotating the data from the one-bit rotate means in the first direction by a magnitude (number of positions) specified by shift control signals. Furthermore, the circuit includes output means adapted to receive data from the unidirectional shift/rotate means and providing an N-bit output word which is the input word rotated according to the scale factor and the direction control signals. In the preferred embodiment of the present invention, the unidirectional shift/rotate means is also adapted to receive a rotate control signal and is responsive to the rotate control signal for rotating the data from the one-bit rotate means in the manner described above. However, when the rotate control signal is absent, the shift/rotate means shifts rather than rotates the data from the one-bit rotate mean in the first direction by the magnitude specified by the shift control signals.

DETAILED DESCRIPTION

Figure 1:
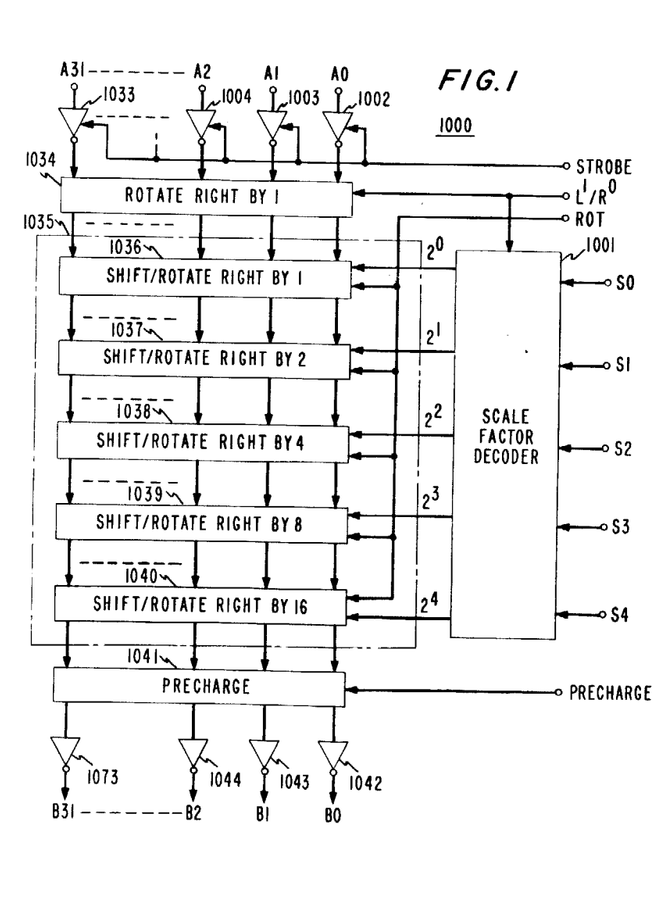
FIG. 1 is a block diagram of a circuit for performing bidirectional rotation or right shifting on a 32-bit binary word according to one embodiment of the present invention.

FIG. 1 shows in block diagram form a circuit 1000 for rotating a 32-bit word by any number of positions up to thirty-one positions in either the right or the left direction or for shifting the 32-bit word by any number positions up to thirty-one positions in only the right direction. A scale factor decoder 1001 receives a five-bit scale factor word S0,S1,S2,S3,S4 and a direction control signal L/R and provides a five-bit shift control word $2^0,2^1,2^2,2^3,2^4$. The scale factor word is a binary number specifying the magnitude (number of positions) of a rotation or a shift operation. The L/R signal is used for selecting the direction of rotation, a logic "0" level signifying a right rotation and a logic "1" level signifying a left rotation. The scale factor decoder 1001 provides a shift control word which is the same as the scale factor word when the L/R signal is a logic "0" level but provides a shift control word which is the complement of the scale factor word when the L/R signal is a logic "1 " level.

A 32-bit input word having bits A0 through A31 is received by thirty-two strobed input inverters 1002 through 1033. For simplicity not all the input inverters are shown in FIG. 1. Each input inverter receives a respective bit of the input word and a STROBE signal and provides the complement of the respective input word bit when the STROBE signal is a logic "1" level. The output of each input inverter floats when the STROBE signal is a logic "0" level.

The complemented input word provided by the input inverters 1002 through 1033 is received as input data by a one-bit rotator 1034 which also receives the L/R signal. The one-bit rotator rotates the input data by one position to the right when the L/R signal is a logic "1" level and provides the input data without rotation when the L/R signal is a logic "0" level.

The data provided by the one-bit rotator 1034 is received by a unidirectional shifter/rotator 1035 which also receives the shift control word $2^4,2^3,2^2,2^1,2^0$ and a ROT signal used for selecting either a rotate or a shift operation. Data received by the shifter/rotator is shifted in the right direction when the ROT signal is a logic "0" level or is rotated in the right direction when the ROT signal is a logic "1" level. The magnitude of a shift or a rotation performed by the shifter/rotator is specified by the shift control word which is a binary number equal to the number of positions of the shift or rotation.

The shifter/rotator 1035 comprises five levels identified by reference numerals 1036 through 1040. The levels are interconnected in an arrangement in which a first level 1035 receives data from the one-bit rotator and provides data to its immediately succeeding level 1037; a last level 1040 receives data from its immediately preceding level 1039 and provides output data; and each of the other levels 1037, 1038, and 1039 receives data from its immediately preceding level and provides data to its immediately succeeding level. In addition to data from an immediately preceding level, each level also receives a respective bit of the shift control word $2^0$, $2^1$, $2^2$, $2^3$, or $2^4$ and the ROT signal, both of which control the operation performed by the level. When the ROT signal is a logic "0" level, each level of the shifter/rotator performs a right shift of a respective predetermined magnitude if the respective shift control word bit is at a logic "1" level or performs no shift (or rotation) if the respective shift control word bit is at a logic "0" level. When ROT signal is a logic "1" level, each level performs a right rotation of the respective predetermined magnitude if the respective shift control word bit is at a logic "1" level or performs no rotation (or shift) if the respective shift control bit is at a logic "0" level.

The levels 1036 through 1040 are ranked from 0 through 4, respectively. The predetermined magnitude of the shift or rotation performed by each level is equal to two raised to the power of the rank of the level. Therefore, the predetermined magnitudes of the shift or rotation performed by the levels 1036 through 1040 are 1, 2, 4, 8, and 16, respectively. The levels of the shifter/rotator need not be arranged according to their ranks. The sum of the magnitudes of the shifts or rotations performed by the individual levels 1036 through 1040 of the shifter/rotator is equal to the the total magnitude of shift or rotation specified by the shift control word.

The output data from the last level 1040 passes through a precharge network 1041 to thirty-two output inverters 1042 through 1073 which complement the output data to form a 32-bit output word having bits B0 through B31. For simplicity of the drawing, not all the output inverters are shown.

The precharge network 1041 receives a PRECHARGE signal, and when the PRECHARGE signal is a logic "0" level, the precharge network forces all the data lines in the shifter/rotator and the one-bit rotator to a logic "1" level. In normal operation a logic "0" level PRECHARGE signal is applied only during the intervals when the STROBE signal is a logic "0" level, the PRECHARGE signal being set to a logic "0" level before a logic "1" level STROBE signal is applied. Therefore, the precharge network is normally activated only during the intervals when no data is being passed through the circuit, and the data lines of the circuit are released from the precharge voltage before an input word is strobed into the circuit.

Figure 7:
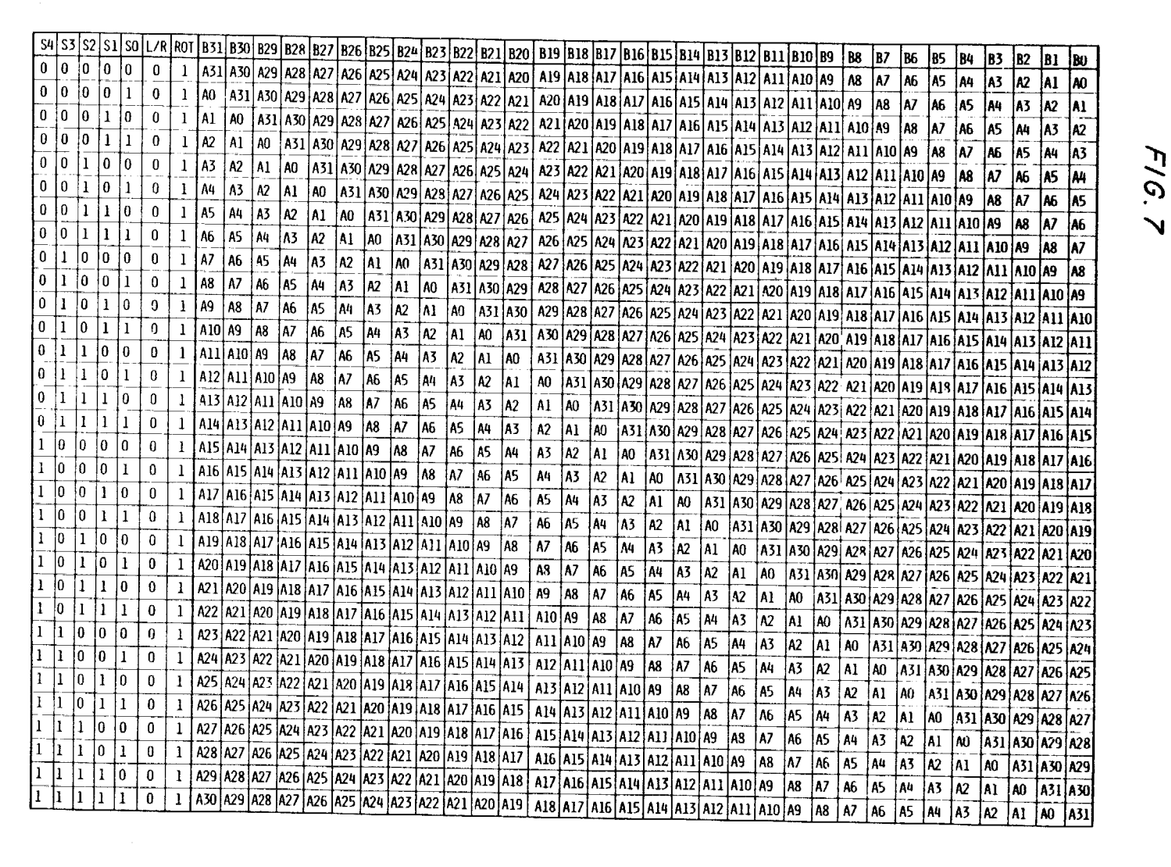
FIG. 7 is a truth table illustrating a right rotate operation.

The right rotate operation performed by the circuit of FIG. 1 is illustrated by the truth table of FIG. 7. A right rotate operation occurs when the L/R signal is set to a logic "0" level and the ROT signal is set to a logic "1" level. The number of positions rotated is controlled by the scale factor word S4,S3,S2,S1,S0. In the truth table, the input work is represented by bits A0 through A31, and the output work is represented by bits B0 through B31. Those bits of the input word which are shifted off the right end reappear in the vacated bit positions on the left end.

Figure 8:
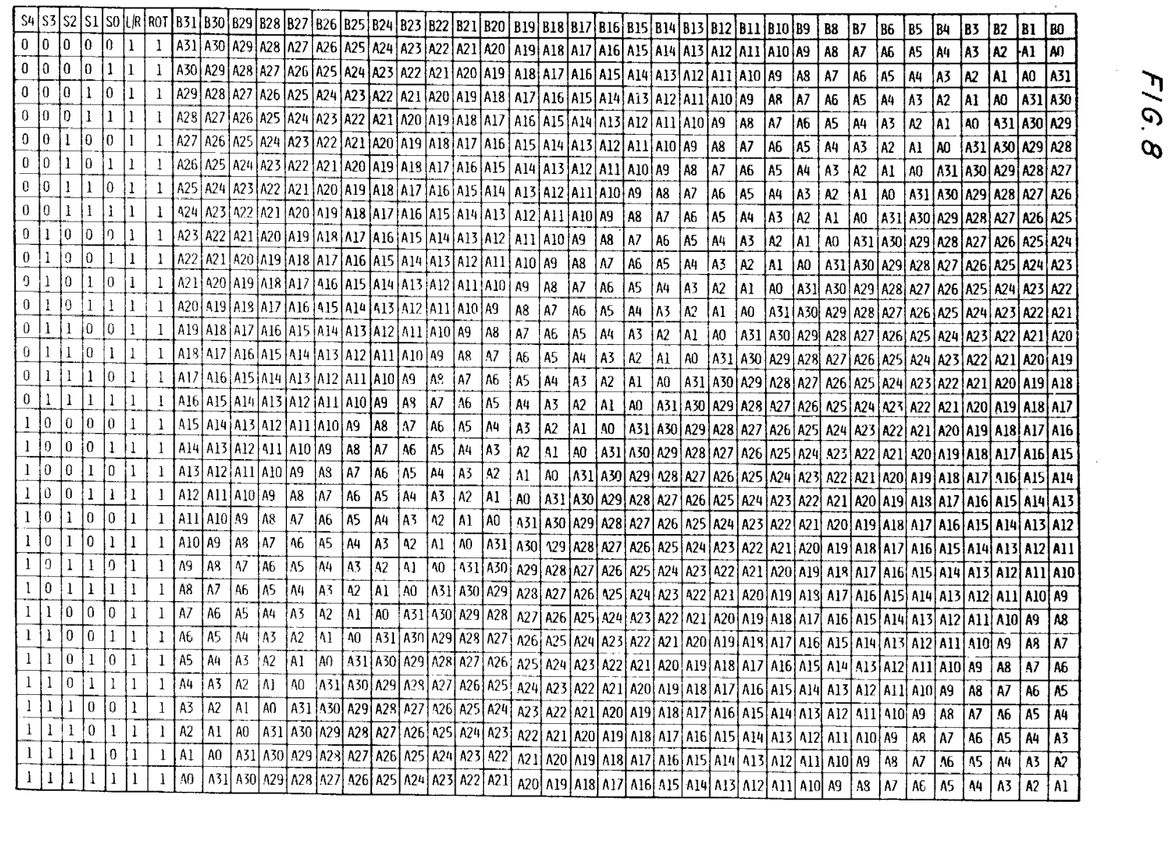
FIG. 8 is a truth table illustrating a left rotate operation.

The left rotate operation performed by the circuit of FIG. 1 is illustrated by the truth table of FIG. 8. A left rotate operation occurs when both the L/R and ROT signals are set to a logic "1" level. The number of positions rotated is controlled by the scale factor word S4,S3,S2,S1,S0. Those bits of the input word which are shifted off the left end reappear in the vacated bit positions on the right end.

Figure 9:
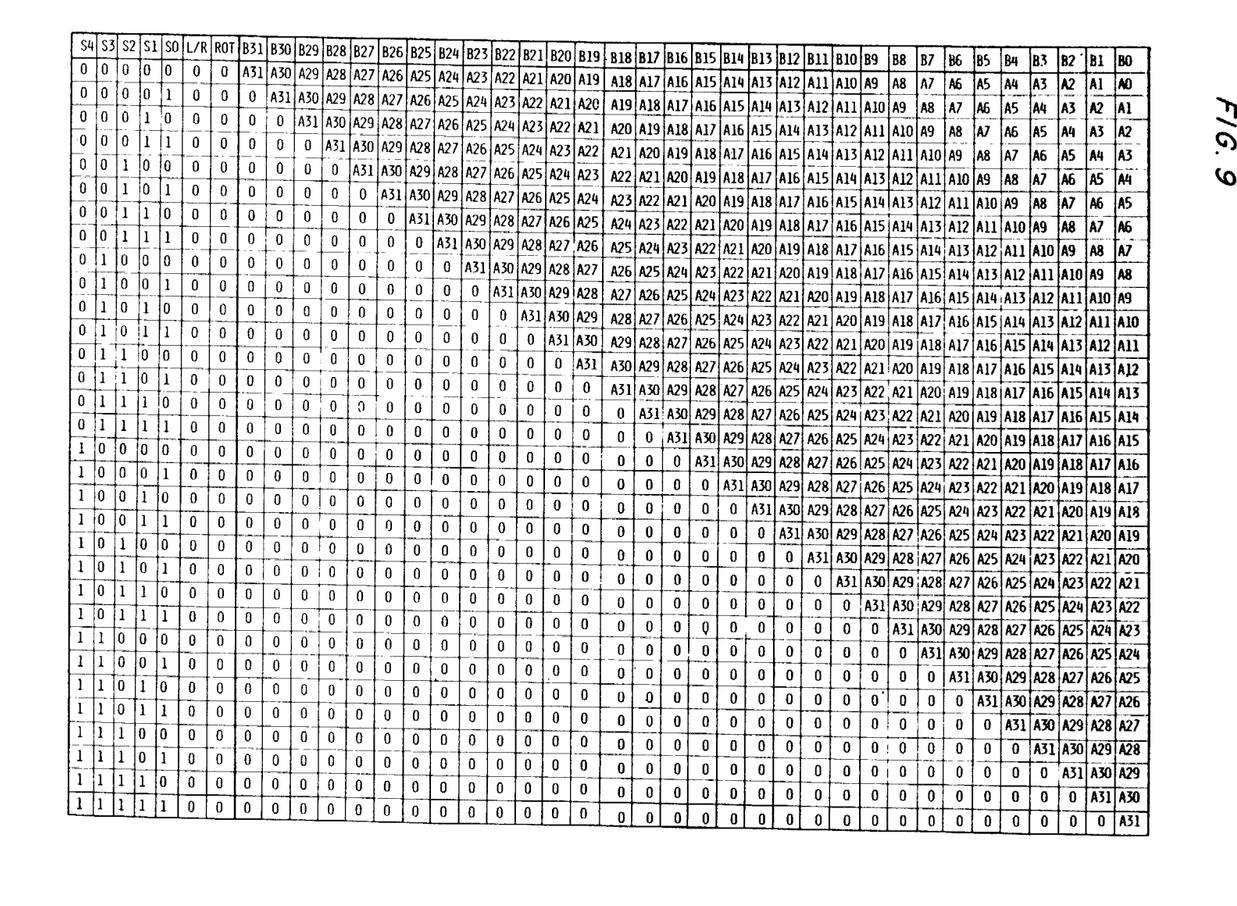
FIG. 9 is a truth table illustrating a right shift operation.

The right shift operation performed by the circuit of FIG. 1 is illustrated by the truth table of FIG. 9. A right shift operation occurs when the L/R and ROT signals are both set to a logic "0" level. The number of positions shifted is controlled by the scale factor word S4,S3,S2,S1,S0. As the input word is shifted to the right, each bit position vacated on the left is replaced by a "0."

The circuit of FIG. 1 provides a rotation in either the right or left direction using a shifter/rotator 1035 which provides rotation in only the right direction. A left rotation is achieved by means of the one-bit rotator which provides an additional position of right rotation when the L/R signal is at a logic "1" level and the scale factor decoder which provides the complement of the scale factor word when the L/R signal is at a logic "1" level. Thus when the L/R signal is a logic "1" level, the input word is rotated to the right by a magnitude equal to the complement of the scale factor word plus one additional position. Such a right rotation is equivalent to a left rotation of the input word by a magnitude equal to the scale factor word.

It is contemplated that the circuit of FIG. 1 will be used in conjunction with a mask generator and an appropriate gating network to provide bidirectional shifting as well as bidirectional rotation. In such an application a shifting operation is performed by combining rotation and masking operations. Therefore, a rotate circuit to be used in conjunction with a mask generator need not also perform any shifting operations. However, as will be explained below, a unidirectional shifter/rotator according to the present invention may be designed to also perform unidirectional shifting operations without significantly increasing circuit complexity. Using a shifter/rotator of such a design, masking is not required for a shift operation in one direction, thus allowing certain simplifications in the mask generator circuit.

Figure 2:
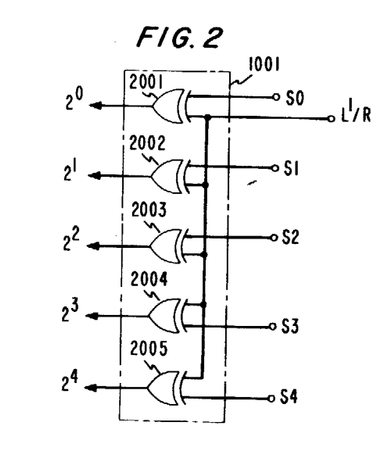
FIG. 2 is a logic digram of the scale factor decoder used in the circuit of FIG. 1.

The preferred embodiment of the scale factor decoder used in the circuit of FIG. 1 is illustrated in FIG. 2. Reference characters used to refer to components of the circuit of FIG. 1 are also being used to refer to corresponding components in FIG. 2. The scale factor decoder 1001 has five two-input EXCLUSIVE OR gates 2001 through 2005 each one receiving a respective bit of the scale factor word and the L/R signal S0,S1,S2,S3,S4 and providing a respective bit of the shift control word. The design of such two-input EXCLUSIVE OR gates in the various integrated circuit technologies is well known to one skilled in the art.

Figure 3:
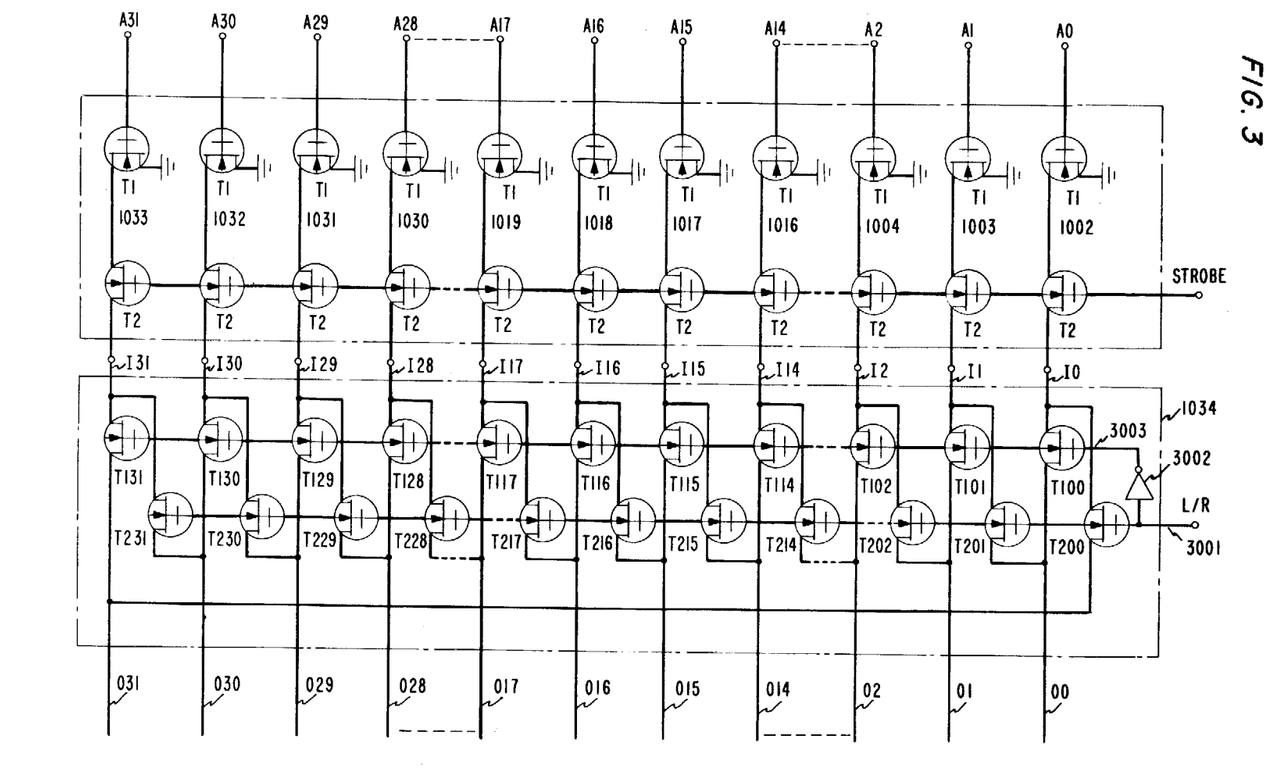
FIGS. 3, 4, and 5 form a schematic diagram of the circuit of FIG. 1 but without the scale factor decoder.
Figure 4:
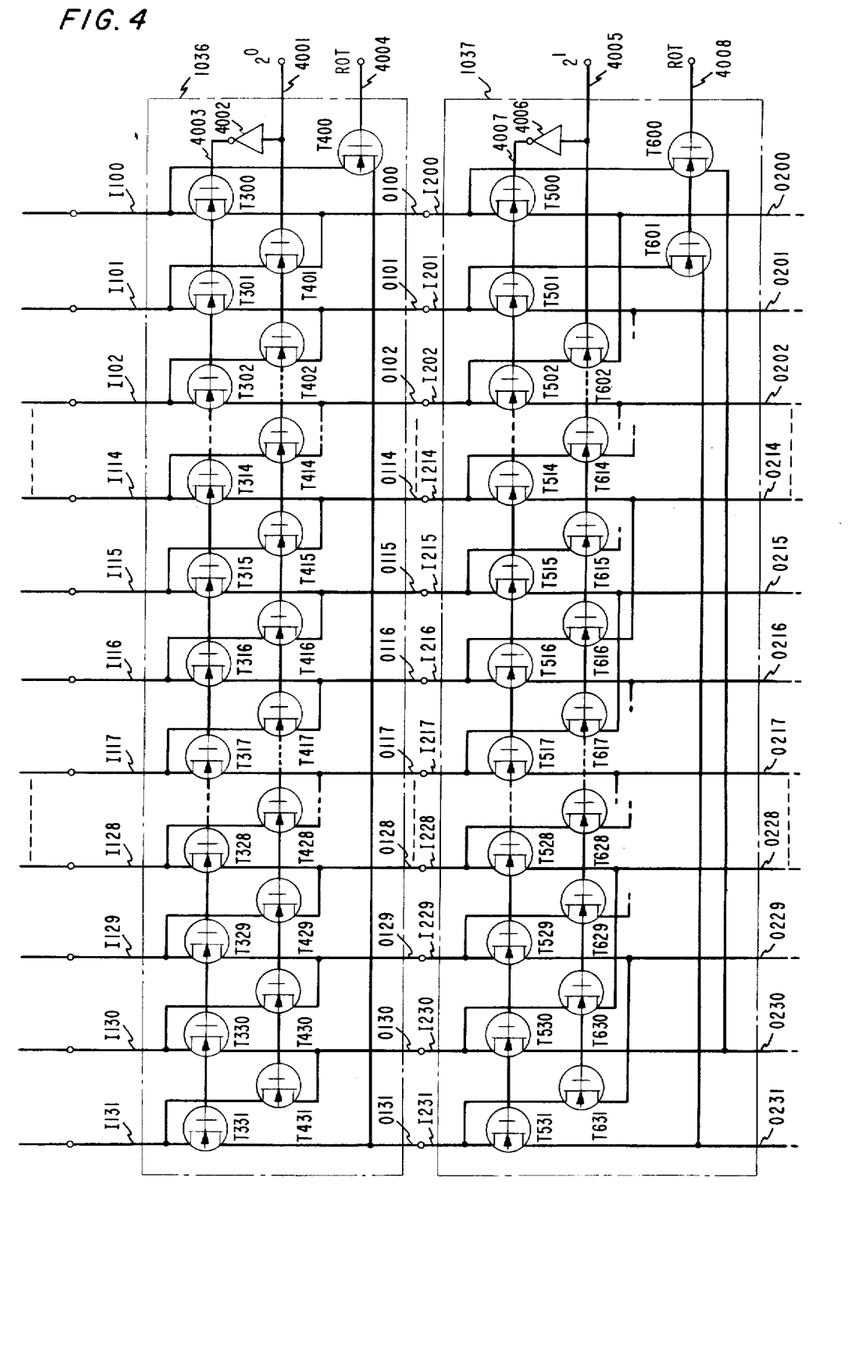
Figure 5:
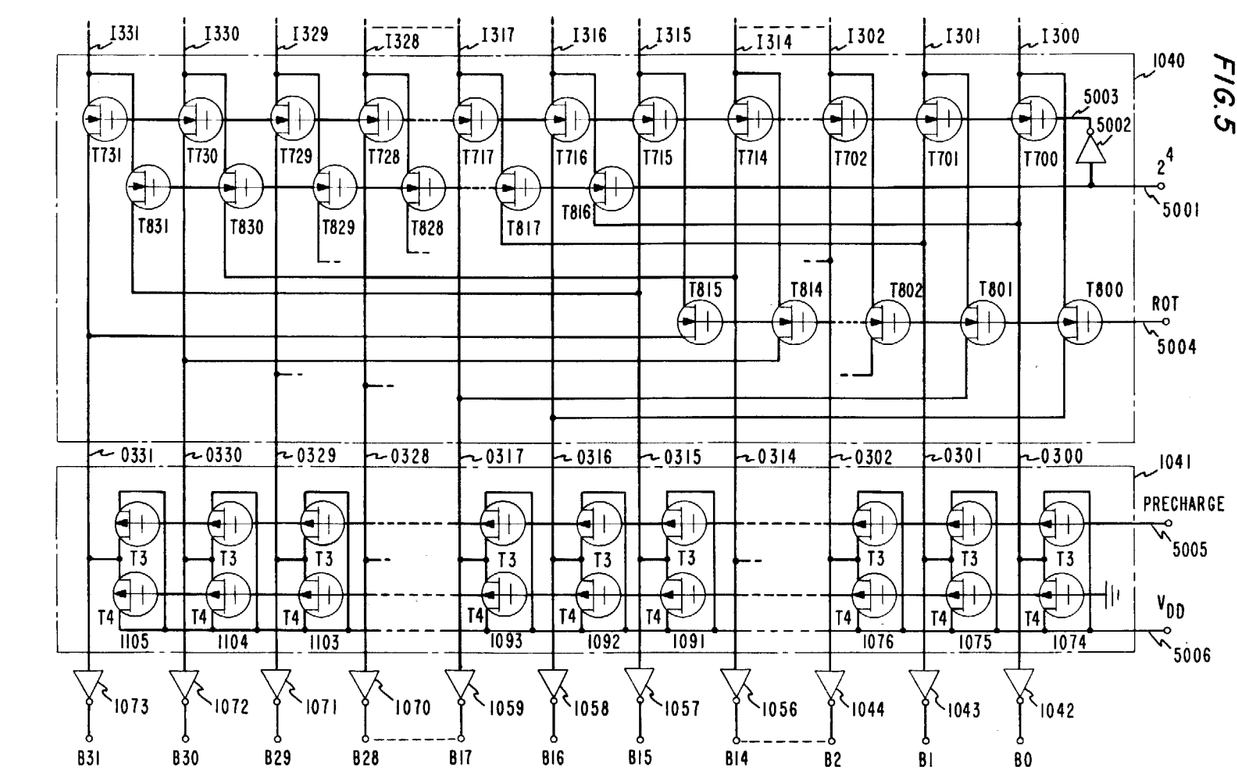
Figure 6:
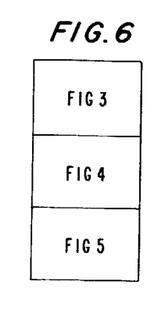
FIG. 6 illustrates the relative positions of FIGS. 3, 4, and 5.

FIGS. 3, 4, and 5 arranged according to FIG. 6 form a schematic diagram of the circuit of FIG. 1 but without the scale factor decoder. Reference characters used to refer to components of the circuit of FIG. 1 are also being used to refer to corresponding components in FIGS. 3, 4, and 5. For simplicity certain components of the circuit which are repetitive and not essential to the description of the circuit have been omitted from FIGS. 3, 4, and 5.

The circuit is implemented in complementary metal-oxide-semiconductor (CMOS) technology and operates between a positive VDD supply voltage and ground potential. A signal level which is substantially VDD represents the logic "1" state for the circuit while a signal level which is substantially ground potential represents a logic "0" state for the circuit.

Referring now to FIG. 3, there is shown a schematic diagram of the thirty-two strobed input inverters 1002 through 1033 and of the one-bit rotator 1034. Each of the input inverters comprises a pair of n-channel transistors T1 and T2 having their conduction channels connected in series between ground and a respective one of thirty-two input conductors I0 through I31 (not all are shown) of the one-bit rotator. The conduction channel of an insulated-gate field-effect transistor (IGFET) is the region lying between the source and drain electrodes of the transistor. Since IGFETs are in general bilateral devices, the distinction between the source and drain electrodes is not important for purposes of circuit description. As is well known, the current flowing through the conduction channel of an IGFET is controlled by the voltage applied to the gate electrode of the IGFET and can be varied from a relatively high value when the IGFET is driven into the ON state to a vanishingly small value when the IGFET is driven into the OFF state. The absolute value of the current flowing through the conduction channel of an IGFET in the ON state depends, among other parameters, on the width to length ratio of the channel region and the voltage applied to the gate electrode.

In each input inverter, the gate electrode of T1 is connected to receive a respective bit of the input word A0 through A31, and the gate electrode of T2 is connected to receive the STROBE signal. When the STROBE signal is a logic "0" level, T1 and T2 in each input inverter are both in the OFF state, and each of the input conductors I0 through I31 of the one-bit rotator is isolated from ground. As mentioned above, during those intervals when the STROBE signal is at a logic "0" level, the input conductors of the one-bit rotator are all precharged to a logic "1" level by the precharge network. However, the input conductors are all released from the precharge voltage before a logic "1" level STROBE signal is applied.

When the STROBE signal goes to a logic "1" level, transistors T1 and T2 in those input inverters receiving logic "1" bits of the input word are driven to the ON state while transistors T1 and T2 in those input inverters receiving logic "0" bits of the input word remain in the OFF state. Consequently, those input conductors connected to input inverters receiving logic "1" bits are pulled to a logic "0" level (i.e., ground potential) while the other input conductors which are connected to input inverters receiving logic "0" bits remain at a logic "1" level (i.e., the precharge voltage). Therefore, the input data received by the one-bit rotator is the complement of the input word.

In addition to having thirty-two input conductors I0 through I31 representing thirty-two bit positions, the one-bit rotator 1034 also has thirty-two output conductors O0 through O31 (not all are shown) also representing the thirty-two bit positions. The bit positions are consecutively numbered along the left direction. Each input conductor is coupled through the conduction channel of a respective one of a first group of thirty-two n-channel transistors T100 through T131 (not all are shown) to a corresponding output conductor representing a like bit position. The gate electrodes of transistors T100 through T131 are all connected to a conductor 3003 carrying the complement of the L/R signal generated by a CMOS inverter 3002 which receives the L/R signal. Each input conductor except the right-most one I0 is also coupled through the conduction channel of a respective one of a second group of thirty-two n-channel transistors T200 through T231 (not all are shown) to an output conductor representing a bit position displaced one position to the right of that represented by the input conductor. The right-most input conductor I0 is coupled to the left-most output conductor O31 through the conduction channel of transistor T200. The gate electrodes of transistors T200 through T231 are all connected to a condutor 3001 carrying the L/R signal.

When the L/R signal is a logic "0" level, transistors T200 through T231 which receive a logic "0" level at their gate electrodes are all in the OFF state while transistors T100 through T131 which receives a logic "0" level at their gate electrodes provided by the inverter 3002 are all permitted to go to the ON state. Under these conditions the data signal on each of the input conductors except the right-most one I0 is transferred to an output conductor representing a like bit position.

When the L/R signal is a logic "1" level, transistors T100 through T131 which receive a logic "0" level at their gate electrodes provided by the inverter 3002 are all in the OFF state while transistors T200 through T231 which receive a logic "1" level at their gate electrodes are all permitted to go to the ON state. Under these conditions the data signal on each of the input conductors except the right-most one I0 is transferred to an output conductor representing a bit position displaced one position to the right of that represented by the input conductor. The data signal on the right-most input conductor I0 is transferred to left-most output conductor O31 which represents a bit position circularly displaced one position to the right of that represented by input conductor I0.

Referring now to FIG. 4, there is shown a schematic diagram of levels 1036 and 1037 of the shifter/rotator. Level 1036 which is designed to shift or rotate data received from the one-bit rotator by one position to the right has thirty-two input conductors I100 through I131 (not all are shown) representing thirty-two bit positions and thirty-two output conductors O100 through O131 (not all are shown) also representing the thirty-two bit positions. The input conductors of level 1036 are each connected to an output conductor of the one-bit rotator (see FIG. 3) representing a like bit position. Each input conductor of level 1036 is coupled through the conduction channel of a respective one of a third group of n-channel transistors T300 through T331 (not all are shown) to a corresponding output conductor of level 1036 representing a like bit position. The gate electrodes of the transistors T300 through T331 are all connected to a conductor 4003 carrying the complement of the $2^0$ signal generated by a CMOS inverter 4002 which receives the $2^0$ signal. Each input conductor of level 1036 except the right-most one I100 is also coupled through the conduction channel of a respective one of a fourth group of n-channel transistors T401 through T431 (not all are shown) to an output conductor representing a bit position displaced one position to the right of that represented by the input conductor. The gate electrodes of the transistors T401 through T431 are all connected to a conductor 4001 carrying the $2^0$ signal. The right-most input conductor I100 is coupled to the left-most output conductor O131 through the conduction channel of an n-channel transistor T400 forming a fifth group whose gate electrode is connected to a conductor 4004 carrying the ROT signal.

When both the $2^0$ and ROT signals are each a logic "0" level, transistors T401 through T431 and T400 are all in the OFF state while transistors T300 through T331 are all permitted to go to the ON state. Under these conditions the data signal on each of the input conductors of level 1036 is transferred to a corresponding output conductor of level 1036 representing a like bit position.

When the $2^0$ signal is a logic "1" level and the ROT signal is a logic "0" level, transistors T300 through T331 and T400 are all in the OFF state while the transistors T401 through T431 are all permitted to go to the ON state. Under these conditions, the data signal on each input conductor except the right-most one I100 is transferred to an output conductor representing a bit position displaced by one position to the right of that represented by the input conductor. If while the $2^0$ signal is a logic "1" level, the ROT signal is also a logic "1" level, transistor T400 is permitted to go to the ON state, and the data on the right-most input conductor I100 is transferred to the left-most output conductor O131 which represents a bit position circularly displaced by one position to the right of that represented by input conductor I100. In normal operation a logic "1" level ROT signal is not applied when the $2^0$ signal is at a logic "0" level.

Level 1037 which is designed to provide a shift or rotate of data received from level 1036 by two positions to the right thirty-two input conductors I200 through I231 (not all are shown) representing thirty-two bit positions and thirty-two output conductors O200 through O231 (not all are shown) also representing the thirty-two bit positions. The input conductors of level 1037 are each connected to an output conductor of level 1036 representing a like bit position. Each input conductor of level 1037 is also coupled through the conduction channel of a respective one of a third group of n-channel transistors T500 through T531 (not all are shown) to a corresponding output conductor of the level 1037 representing a like bit position. The gate electrodes of T500 through T531 are all connected to a conductor 4007 carrying the complement of the $2^1$ signal generated by a CMOS inverter 4006 which receives the $2^1$ signal. Each input conductor of level 1037 except the two right-most two I200 and I201 is also coupled through the conduction channel of a respective one of a fourth group of n-channel transistors T602 through T631 (not all are shown) to an output conductor representing a bit position displaced two positions to the right of that represented by the input conductor. The gate electrodes of transistors T602 through T631 are all connected to a conductor 4005 carrying the $2^1$ signal. Input conductors I200 and I201 are coupled respectively through the conduction channels of a fifth group of n-channel transistors T600 and T601 to output conductors O230 and O231. The gate electrodes of transistors T600 and T601 are both connected to a conductor 4008 carrying the ROT signal.

When both the $2^1$ and the ROT signals are each a logic "0" level, transistors T600 through T631 are in the OFF state while transistors T500 through T531 are all permitted to go to the ON state. Under these conditions the data signal on each input conductor of level 1037 is transferred to a corresponding output conductor of level 1037 representing a like bit position.

When the $2^1$ signal is a logic "1" level and the ROT signal is a logic "0" level, transistors T500 through T531, T600 and T601 are all in the OFF state while transistors T602 through T631 are all permitted to go to the ON state. Under these conditions the data signal on each input conductor except the right-most two I200 and I201 is transferred to an output conductor representing a bit position displaced by two positions to the right of that represented by the input conductor. If while the $2^1$ signal is a logic "1" level, the ROT signal is also a logic "1" level, transistors T600 and T601 are permitted to go to the ON state, and the data signals on input conductors I200 and I201 are respectively transferred to output conductors O230 and O231 which represent bit positions circularly displaced by two positions to the right of those represented by input conductors I200 and I201, respectively. In normal operation a logic "1" level ROT signal is not applied when the $2^1$ signal is a logic "0" level.

Referring now to FIG. 5, there is shown a schematic diagram of level 1040 of the shifter/rotator, the precharge network 1041 and the output inverters 1042 through 1073 (not all are shown). For simplicity of the drawing, levels 1038 and 1039 have been omitted from the depiction. The circuit details of levels 1038 and 1039 which are designed to provide shift or rotation in the right direction by four and eight positions, respectively, will be obvious to one skilled in the art of IGFET circuit design from the description of the circuit details of levels 1036, 1037 and 1040 which are designed to provide shift or rotation in the right direction by one, two, and sixteen positions, respectively.

Level 1040 has thirty-two input conductors I300 through I331 (not all are shown) representing thirty-two bit positions and thirty-two output conductors O300 through O331 (not all are shown) also representing the thirty-two bit positions. The input conductors of level 1040 are each connected to an output conductor of level 1039 (not shown) representing a like bit position. Each input conductor of level 1040 is coupled through the conduction channel of a respective one of a third group of n-channel transistors T700 and T731 (not all are shown) to a corresponding output conductor of level 1040 respresenting a like bit position. The gate electrodes of transistors T700 through T731 are all connected to a conductor 5003 carrying the complement of the $2^4$ signal provided by a CMOS inverter 5002 which receives the $2^4$ signal. Each input conductor except the right-most sixteen I300 through I315 is also coupled through the conduction channel of a respective one of a fourth group of n-channel transistors T816 through T831 (not all are shown) to an output conductor representing a bit position displaced by sixteen positions to the right of that represented by the input conductor. The gate electrodes of transistors T816 through T831 are all connected to a conductor 5001 carrying the $2^4$ signal. The right-most sixteen input conductors I300 through I315 are respectively coupled through the conduction channels of a fifth group of n-channel transistors T800 through T815 (not all shown) to the sixteen left-most output conductors O316 through O331. The gate electrodes of T800 through T815 are all connected to a conductor 5004 carrying the ROT signal.

When the $2^4$ signal and the ROT signal are each a logic "0" level, transistors T800 through T831 are all in the OFF state while transistors T700 through T731 are all permitted to go to the ON state. Under these conditions the data signal on each input conductor of level 1040 is transferred to a corresponding output conductor of level 1040 representing a like bit position.

When the $2^4$ signal is a logic "1" level, and the ROT signal is a logic "0" level, transistors T700 through T731 and T800 through T815 are all in the OFF state while transistors T816 through T831 are all permitted to go to the ON state. Under these conditions the data on each of the input conductors except the right-most sixteen I300 through I315 are transferred to an output conductor representing a bit position displaced sixteen positions to the right of that represented by the input conductor. If while the $2^4$ signal is at a logic "1" level, the ROT signal is also at a logic "1" level, transistors T800 through T815 are permitted to go to the ON state, and the data signals on the sixteen right-most input conductors I300 through I315 are transferred to output conductors O316 through O331, respectively. The bit positions represented by output conductors O316 through O331 are circularly displaced to the right by sixteen positions from those represented by the input conductors I300 through I315, respectively.

Each one of the output conductors O300 through O331 is connected to the input of a respective one of thirty-two output inverters 1042 through 1073 (not all are shown). Each output inverter provides a respective bit of the output word B0 through B31.

The precharge network 1041 comprises thirty-two pairs 1074 through 1105 of p-channel transistors (not all pairs are shown). Each pair includes transistors T3 and T2 both having their conduction channels coupled between a respective one of the output conductors of level 1040 and a conductor 5006 carrying VDD. The gate electrode of transistor T4 is connected to a conductor 5005 carrying the PRECHARGE signal while the gate electrode of T3 is connected to ground. Transistor T3 is designed to provide a relatively large current when driven to the ON state to permit a rapid precharge of the respective output conductor. Therefore, transistor T3 has a relatively large channel width to channel length ratio. On the other hand, transistor T4, which remains in the ON state even when T3 is in the OFF state, is designed to provide a relatively low current which is sufficient to sustain a logic "1" level on the respective output conductor against leakage currents but which is not sufficient to hold the output conductor against a logic "0" data signal. Therefore, transistor T3 has a relatively small channel width to channel length ratio. Transistors T3 and T4 are driven to the ON state by a logic "0" level applied to their respective gate electrodes.

In normal operation, the bits $2^4$, $2^3$, $2^2$, $2^1$ and $2^0$ of the shift control word are all set to a logic "0" level during intervals when the PRECHARGE signal is at a logic "0" level. Therefore, during those intervals, transistors in the third group in each level of the shifter/rotator and in the first group in the one-bit rotator are all permitted to go to the ON state, and all the input and output conductors of each level and the one-bit rotator are precharged to a logic "1" level.

Although the disclosed embodiment of the present invention is implemented in CMOS, a shift/rotate circuit according to the present invention may also be implemented in other integrated circuit technologies such as p-channel metal-oxide-semiconductor (PMOS) technology and n-channel metal-oxide-semiconductor (NMOS) technology with appropriate modifications to the polarities and magnitudes of the supply voltages and logic levels as would be obvious to one skilled in the art of integrated circuit design.

It will be understood by those skilled in the art that the foregoing and other modifications and other alterations may be made to the described embodiment without departing from the spirit and scope of the present invention. For example, the shifter/rotator may be modified to provide only the rotation operation by eliminating the ROT signal and by connecting the conductor for carrying the ROT signal in each level of the shifter/rotator to the conductor carrying the respective bit of the shift control word. In addition, the transistors of the first and second groups in the one-bit rotator and of the third, fourth, and fifth groups in the shifter/rotator which serve as transmission gate switches may be replaced by equivalent switch means as are known or as will be discovered.

What is claimed is:

1. A circuit for rotating an N-bit binary word in either a first or a second direction comprising:
   control means adapted to receive a plurality of scale factor signals and a direction control signal indicative of a rotation in the second direction, and responsive thereto for providing a plurality of shift control signals which are respectively the complement of the scale factor signals, the control means providing a plurality of shift control signals which are respectively the same as the scale factor signals when the direction control signal is absent;
   input means adapted to receive an N-bit input word and providing corresponding N-bit input data;
   one-bit rotate means adapted to receive the input data and the direction control signal and being responsive to the direction control signal for rotating the input data by one position in the first direction, the one-bit rotate means providing the input data without rotation when the direction control signal is absent;
   unidirectional shift/rotate means adapted to receive data from the one-bit rotate means and the plurality of shift control signals and for rotating the data from the one-bit rotate means in the first direction by a magnitude specified by the shift control signals; and
   output means adapted to receive data from the unidirectional shift/rotate means for providing an N-bit output word which is the input word rotated according to the scale factor signals and the direction control signal.

2. A shift/rotate circuit for shifting an N-bit binary word in a first direction and for rotating the binary word in either the first or a second direction comprising:
   control means adapted to receive a plurality of scale factor signals and a direction control signal indicative of a rotation in the second direction and being responsive thereto for providing a plurality of shift control signals which are respectively the complement of the scale factor signals, the control means for providing shift control signals which are respectively the same as the scale factor signals when the direction control signal is absent;
   input means adapted to receive an N-bit input word and for providing corresponding N-bit input data;
   one-bit rotate means adapted to receive the input data and the direction control signal and being responsive to the direction control signal for rotating the input data by one position in the first direction, the one-bit rotate means providing the input data without rotation when the direction control signal is absent;
   undirectional shift/rotate means adapted to receive data from the one-bit rotate means, the plurality of shift control signals and a rotate control signal and being responsive to the rotate control signal for rotating the data from the one-bit rotate means in the first direction by a magnitude specified by the shift control signals, the unidirectional shift/rotate means shifting the data from the one-bit rotate means in the first direction by the magnitude specified by the shift control signals; and
   output means adapted to receive data from the unidirectional shift/rotate means for providing an N-bit output word which is the input word shifted or rotated according to the scale factor, direction control and rotate control signals.

3. A shift/rotate circuit as recited in claim 2 wherein the unidirectional shift/rotate means comprise a plurality of ranked levels including a first and a last level, each level being adapted to receive incoming data, a respective one of the shift control signals and the rotate control signal, each level being responsive to the respective shift control signal and the rotate control signal for rotating the incoming data in the first direction by a predetermined number of positions, each level being responsive to the respective shift control signal for shifting the incoming data in the first direction by the predetermined number of positions when the rotate control signal is absent, each level providing the incoming data without shift or rotation when the respective shift control signal is absent, each level except the first being coupled to receive data from the immediately preceding level, the first level being coupled to receive data from the one-bit rotate means, and the last level providing data to the output means.

4. A shift-rotate circuit as recited in claim 3 wherein the one-bit rotate means comprise:
   N input conductors representing N bit positions including a first and a last bit position along the second direction;
   N output conductors representing N bit positions including a first and a last bit position along the second direction;
   means providing a no-rotation control signal when the direction control signal is absent;
   a no-rotation conductor for transmitting the no-rotation control signal;
   a direction conductor for transmitting the direction control signal;
   a plurality of first switch means, a respective one coupled between each input conductor and a corresponding output conductor representing a like bit position for transferring data signals on the input conductors to the corresponding output conductors in response to the no-rotation signal; and a plurality of second switch means, a respective one coupled between each input conductor except the one representing the first bit position and an output conductor representing a bit position displaced by one position in the first direction from that represented by the input conductor, and a respective one coupled between the input conductor representing the first bit position and the output conductor representing the last bit position, the second switch means transferring a data signal from the input conductor to the output conductor coupled thereby in response to the direction control signal.

5. A shift/rotate circuit as recited in claim 4 wherein each level of the unidirectional shift/rotate means comprises:

N input conductors representing N bit positions including a first and a last bit position along the second direction;

N output conductors representing N bit positions including a first and a last bit position along the second direction;

means providing a no-shift signal when the respective shift control signal is absent;

a no-shift conductor for transmitting the no-shift control signal;

a shift conductor for transmitting the respective shift control signal;

a rotate conductor for transmitting the rotate control signal;

a plurality of third switch means, a respective one coupled between each input conductor and a corresponding output conductor of a like bit position for transferring data signals on the input conductors to the corresponding output conductors in response to the no-shift signal;

a plurality of fourth switch means, a respective one coupled between each input conductor except the ones representing those bit positions which are less than the predetermined number of positions from the first bit position and an output conductor representing a bit position displaced by the predetermined number of positions in the first direction from that represented by the input conductor, the fourth switch means transferring a data signal from the input conductor to the output conductor coupled thereby in response to the respective shift control signal; and one or more fifth switch means, a respective one coupled between each input conductor representing a bit position which is less than the predetermined number of positions from the first bit position and an output conductor representing a bit position circularly displaced by the predetermined number of bit positions in the first direction from that represented by the input conductor, the fifth switch means transferring a data signal from the input conductor to the output conductor coupled thereby in response to the rotate control signal.

6. A shift/rotate circuit as recited in claim 5 wherein the control means comprise a plurality of logic circuits each adapted to receive a respective one of the scale factor signals and the direction control signal and providing a shift control signal which is the EXCLUSIVE OR function of the respective scale factor signal and the direction control signal, the input means comprise a plurality of strobed inverter circuits each adapted to receive a respective bit of the input word and a first signal and being responsive thereto for providing a corresponding bit of input data, the output means comprise a plurality of inverter circuits each adapted to receive a respective bit of the data from the unidirectional shift/rotate means and providing a corresponding bit of the output word, the means providing the no-rotation control signal of the one-bit rotate means comprise an inverter circuit adapted to receive the direction control signal and providing the complement thereof to the no-rotation conductor, the means providing the no-shift control signal in each level of the unidirectional shift/rotate means comprise an inverter circuit adapted to receive the respective shift control signal and providing the complement thereof to the no-shift conductor, the plurality of first switch means of the one-bit rotate means each comprise an IGFET transmission gate having a control electrode coupled to the no-rotation conductor, the plurality of second switch means of the one-bit rotate means each comprise an IGFET transmission gate having a control electrode coupled to the direction conductor, the plurality of third switch means in each level of the unidirectional shift/rotate means each comprise an IGFET transmission gate having a control electrode coupled to the no shift conductor, the plurality of fourth switch means of the unidirectional shift/rotate means each comprise an IGFET transmission gate having a control electrode coupled to the shift conductor, and the plurality of fifth switch means of the unidirectional shift/rotate means each comprise an IGFET transmission gate having a control electrode coupled to the rotate conductor.

7. A shift/rotate circuit as recited in claim 6 wherein the strobed inverter circuits of the input means each comprises a first IGFET having a conduction channel coupled between a first conductor adapted to receive a first operating voltage and a first node and a gate electrode adapted to receive a respective bit of the input word, and a second IGFET having a conduction channel coupled between the first node and a respective one of the input conductors of the one-bit rotate means and a gate electrode adapted to receive the first signal; the IGFET transmission gates of the first, second, third, fourth, and fifth switch means each comprises an IGFET having a gate electrode serving as the control electrode; and there are included precharge means comprising a plurality of load IGFETs each having a conduction channel coupled between a second conductor adapted to receive a second operating voltage and a respective one of the output conductors of one of the levels of unidirectional shift/rotate means or the one-bit rotate means and a gate electrode adapted to receive a second signal, the precharge means being responsive to the second signal for holding the output conductors of the one of the levels of unidirectional shift/rotate means or of the one-bit rotate means at substantially the second operating voltage.

8. A shift/rotate circuit as recited in claim 7 wherein the first and second IGFETs of the strobed inverter circuits, the IGFETs of the transmission gates of the first, second, third, fourth and fifth switch means are of a first channel conductivity type and the load IGFETs of the precharge means are of a second channel conductivity type.

9. A shift/rotate circuit as recited in claim 8 wherein the precharge means further comprise a plurality of sustaining IGFETs of the second channel conductivity type and having a relatively small channel width to channel length ratio, each sustaining IGFET having a conduction channel coupled in parallel with a respective one of the load IGFETs and a gate electrode coupled to the first conductor.

10. A shift/rotate circuit as recited in claim 9 wherein the first channel conductivity type is n-type and the second channel conductivity type is p-type.

* * * * *

UNITED STATES PATENT AND TRADEMARK OFFICE
CERTIFICATE OF CORRECTION

PATENT NO. : 4,396,994

DATED : August 2, 1983

INVENTOR(S) : Sung M. Kang, Robert H. Krambeck and Alfred Y. Kwan

It is certified that error appears in the above-identified patent and that said Letters Patent is hereby corrected as shown below:

In the Title, line designated [75], a third inventor should be added --Alfred Y. Kwan, New York, New York.

In the Abstract, line 18, "shaft" should read --shift--.

Column 8, line 47, after "right" insert --has--.

Signed and Sealed this

Twenty-fifth Day of October 1983

[SEAL]

Attest:

GERALD J. MOSSINGHOFF

Attesting Officer     Commissioner of Patents and Trademarks